United States Patent [19]

Shropshire

[11] Patent Number: 4,658,583
[45] Date of Patent: Apr. 21, 1987

[54] DOUBLE STAGED, INTERNAL ROTARY PUMP WITH FLOW CONTROL

[75] Inventor: David C. Shropshire, Lafayette, Ind.

[73] Assignee: TRW Inc., Cleveland, Ohio

[21] Appl. No.: 619,291

[22] Filed: Jun. 11, 1984

[51] Int. Cl.⁴ .............................................. F16D 31/02
[52] U.S. Cl. ......................................... 60/428; 60/430; 137/566; 137/567; 417/62; 418/10
[58] Field of Search ................. 60/428, 429, 430, 486; 418/6, 10, 166, 171; 417/286, 287, 62; 137/566, 567, 569

[56] References Cited

U.S. PATENT DOCUMENTS

| | | | |
|---|---|---|---|
| 1,970,530 | 8/1934 | West | 417/62 |
| 2,218,565 | 10/1940 | Vickers | 417/62 |
| 2,223,070 | 11/1940 | Kleckner | 418/10 |
| 2,255,560 | 9/1941 | Fieber et al. | 60/430 |
| 2,366,388 | 1/1945 | Crosby | 417/62 |
| 2,377,556 | 6/1945 | Jeannin | 417/62 |
| 2,618,932 | 11/1952 | Taup | 60/430 |
| 3,280,557 | 10/1966 | Sattavara | 60/428 |
| 3,496,960 | 2/1970 | Smith | 137/567 |
| 3,584,537 | 6/1971 | Schulz | 60/430 |
| 3,952,510 | 4/1976 | Peterson | 60/429 |
| 4,206,827 | 6/1980 | Adams | 91/51 |
| 4,382,485 | 5/1983 | Kirkham | 60/428 |
| 4,383,412 | 5/1983 | Presley | 60/430 |
| 4,400,938 | 8/1983 | Ohe | 60/430 |

OTHER PUBLICATIONS

"Fluid Power", Bureau of Naval Personnel, Rate Training Manual, NAVPERS 16193-B, 1970, pp. 126-130.

Primary Examiner—A. Michael Chambers
Attorney, Agent, or Firm—Tarolli, Sundheim & Covell

[57] ABSTRACT

A double-staged, rotary pump and a fluid flow control device is disclosed. An inner rotary member is fixed to a rotatable drive shaft. The inner rotary member has n circumferentially spaced radially projecting teeth. An intermediate rotary member having n+1 internal teeth encircles the inner rotary member and is mounted for rotation about an axis eccentrically disposed from the drive shaft axis. The intermediate member has n+1 circumferentially spaced radially projecting teeth. An outer rotary member having n+2 circumferentially spaced internal teeth encircles the intermediate member and is mounted for rotation about an axis coincident with the drive shaft axis. The inner rotary member drivingly engages the intermediate rotary member which in turn drivingly engages the outer rotary member, all members rotating in the same direction. The external teeth of the inner rotary member and the internal teeth of the intermediate rotary member define a first set of successive expanding pumping chambers and a first set of successive contracting pumping chambers. The external teeth of the intermediate rotary member and the internal teeth of the outer rotary member define a second set of successive expanding pumping chambers and a second set of successive contracting pumping chambers. A valve control means is provided to connect the first pump stage and the second pump stage in differing modes to effectuate series communication, and to effect parallel communication. The valve control means also provides connection with one of the pump stages while connecting the other pump stage to itself.

18 Claims, 15 Drawing Figures

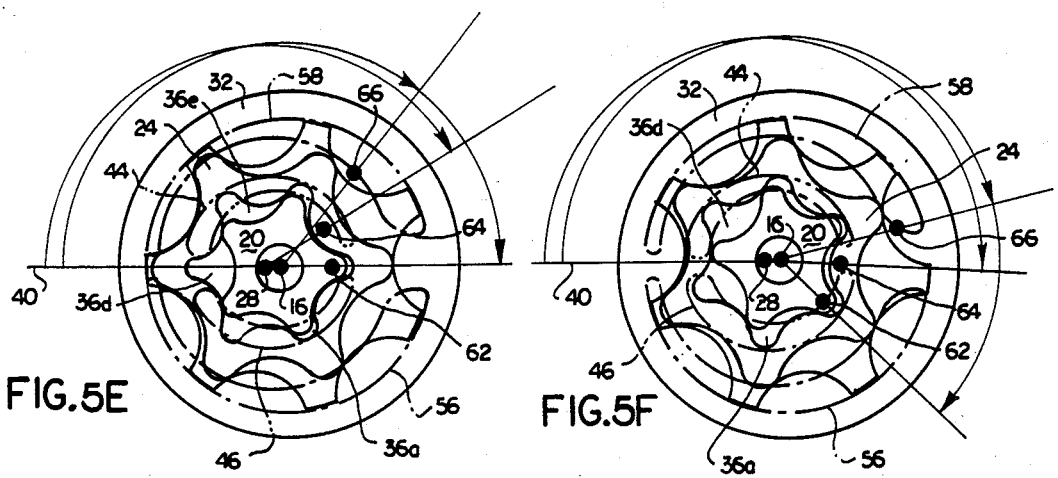
FIG.5E  FIG.5F
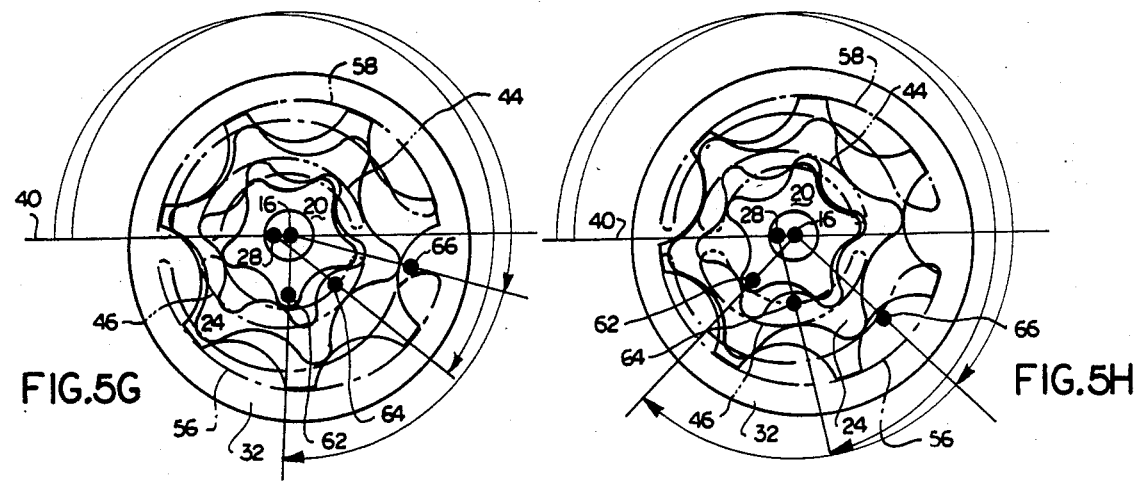
FIG.5G  FIG.5H
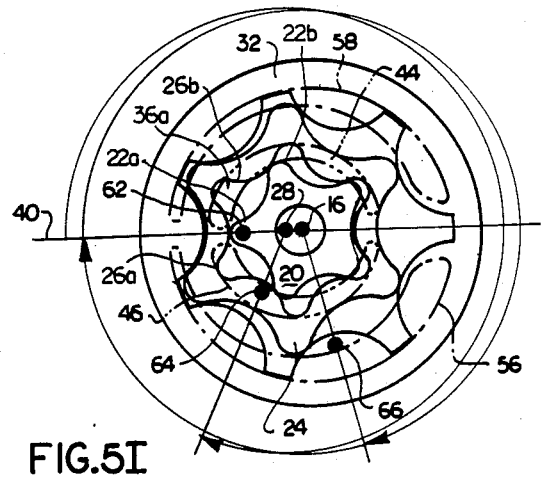
FIG.5I
| INNER ROTARY MEM. | INTERMEDIATE ROTARY MEM. | OUTER ROTARY MEM. |
|---|---|---|
| 0° | 0° | 0° |
| 45° | 37.5° | 32.1° |
| 90° | 75° | 64.3° |
| 135° | 112.5° | 96.4° |
| 180° | 150° | 128.6° |
| 225° | 187.5° | 160.7° |
| 270° | 225° | 192.9° |
| 315° | 262.5° | 225° |
| 360° | 300° | 257.1° |
FIG.6

DOUBLE STAGED, INTERNAL ROTARY PUMP WITH FLOW CONTROL

TECHNICAL FIELD

The present invention relates to a pump and a flow control for controlling flow from the pump, and in particular the present invention relates to a power steering pump and control for controlling flow from the power steering pump to a power steering motor.

BACKGROUND OF THE INVENTION

Pumps for supplying hydraulic fluid to a power steering motor of a vehicle are known. Further, controls for controlling the output of a power steering pump are known. At high vehicle speeds, minimum steering assist is required. Thus, relatively low pressure and flow rates are required from the power steering pump. At low vehicle speeds, greater assist is desirable than at high vehicle speeds. Thus, at low vehicle speeds higher pressure and flow rates are required than those at high vehicle speeds. When maximum assist is required, such as during parking on dry pavement, maximum pressure is required from the power steering pump.

Obviously, it is desirable to have an ultra-compact power steering pump capable of producing the pressure needed to operate the power steering motor for performing steering maneuvers at the different vehicle speeds. Many hydraulic pumps have been developed over the years for use in power steering systems and/or for other uses.

One such pump, known as a gear pump, has a plurality of internal fluid pumping chambers formed between teeth of a gear set. The gear pump has a first gear element which rotates about a fixed axis and a second gear element which rotates about an axis disposed eccentrically from the fixed axis. The gear teeth on the first and second gear elements define pumping chambers. Rotational motion between the first and second gear elements causes one set of pumping chambers to expand and a second set of pumping chambers to contract. Kidney-shaped ports are positioned adjacent the rotating gear members and overlie the rotating gear members such that one kidney-shaped port is in continuous communication with the set of expanding pumping chambers and the other kidney-shaped port is in continuous communication with the set of contracting pumping chambers.

SUMMARY OF THE INVENTION

The present invention comprises a new pump and control for providing hydraulic fluid to a hydraulic device, such as a power steering motor for a vehicle. The new pump includes two pumps or pump stages within a single housing.

A pump in accordance with the invention comprises an inner rotary member fixed to a rotatable drive shaft, the inner rotary member having n number of circumferentially spaced, radially projecting external teeth. An intermediate rotary member encircles the inner rotary member and is mounted for rotation about an axis eccentrically disposed relative to the axis of the drive shaft. The intermediate rotary member has at least $n+1$ circumferentially spaced, internal teeth some of which are in meshing cooperation with the external teeth of the inner rotary member. The radially projecting external teeth of the inner rotary member and the internal teeth of the intermediate member define a first set of successive expanding pumping chambers and a first set of successive contracting pumping chambers. These expanding and contracting pumping chambers constitute the first pump or pump stage.

Upon rotation of the drive shaft, the inner rotary member rotates with respect to the intermediate rotary member. The intermediate rotary member rotates at a speed equal to $n/(n+1)$ times the rotational speed of the inner rotary member. Rotation between the inner rotary member and the intermediate rotary member causes the first set of expanding pumping chambers to expand and the first set of contracting pumping chambers to contract. This results in an output flow from the first pump stage.

The intermediate rotary member has $n+1$ circumferentially spaced, radially projecting external teeth. An outer rotary member encircles the intermediate rotary member. The outer rotary member has $n+2$ number of circumferentially spaced, internal teeth. Some of the internal teeth of the outer rotary member are drivingly engaged by the external teeth of the intermediate member. The outer rotary member is mounted for rotation about an axis coincident with the axis of rotation of the drive shaft. The intermediate rotary member rotates with respect to the outer rotary member. The outer rotary member rotates at a speed equal to $(n+1)/(n+2)$ times the rotational speed of the intermediate member or at a speed equal to $n/(n+2)$ times the rotational speed of the inner rotary member. The teeth of the intermediate rotary member and the outer rotary member define a second set of expandable pumping chambers and a second set of contractable pumping chambers and constitute a second pump or pump stage.

A control valve means selectively (i) connects the two pumps or pump stages in series communication, (ii) connects the two pumps or pump stages in parallel communication, or (iii) connects one pump or pump stage to the hydraulic device and the other pump or pump stage to itself for recirculation of fluid therewithin. The control valve means for controlling flow from the two pumps or pump stages includes a main input port connected to a fluid supply and a main output port connected to a manually controlled steering valve. The control valve means controls the flow from the reservoir to the pumps or pump stages and controls the flow from the pumps or pump stages to the steering valve. The control valve means has three positions. In one position, series communication of the pumps is provided. In a second position, parallel communication of the pumps is provided. In a third position, flow from one pump to the steering valve is provided, while flow from the other pump is recirculated within itself.

The control valve means is selectively movable between its different positions. The control valve means moves between its different positions in response to forces acting thereon. Specifically, the valve is moved by a switching means which responds to fluid pressures within the system. The switching means comprises a pair of pilot controls acting oppositely on the control valve means. A check valve is provided connected to the main output port of the control valve means and to the reservoir. The check valve returns fluid to the fluid reservoir if fluid pressure acting on the check valve exceeds a first predetermined value.

A first orifice is disposed between the main output port and the check valve and a second orifice is disposed between the hydraulic unit (steering valve) and the main output port. A first pilot control is coupled to the check valve side of the first orifice. A second pilot control is coupled to the hydraulic unit side of the second orifice. Spring bias forces act oppositely on the control valve means. The pilot controls switch the valve control means when a predetermined pressure differential exists between the two pilot controls. The switching means switches the flow control means to maintain the pumps in parallel communication when there is an insufficient pressure differential between the first and second pilot controls. The switching means switches the flow control means to the aforementioned third position if the pressure at the first pilot control is greater than the pressure at the second pilot control by an amount in excess of a predetermined limit. The switching means switches the flow control means to the position where the pumps are connected in series communication if the pressure at the first pilot control is less than the pressure at the second pilot control by an amount outside of the predetermined limit.

BRIEF DESCRIPTION OF THE DRAWINGS

Other features and advantages of the present invention will be apparent to those skilled in the art by reference to the following detailed description taken in connection with the accompanying drawings wherein:

FIGS. 5A-5I are schematic illustrations of the pump of FIG. 1 in different stages of rotation;

FIG. 6 is a chart showing the relative positions of the various rotary members corresponding to the different stages of rotation shown in FIGS. 5A-5I.

BEST MODE FOR CARRYING OUT THE INVENTION

Figure 1:
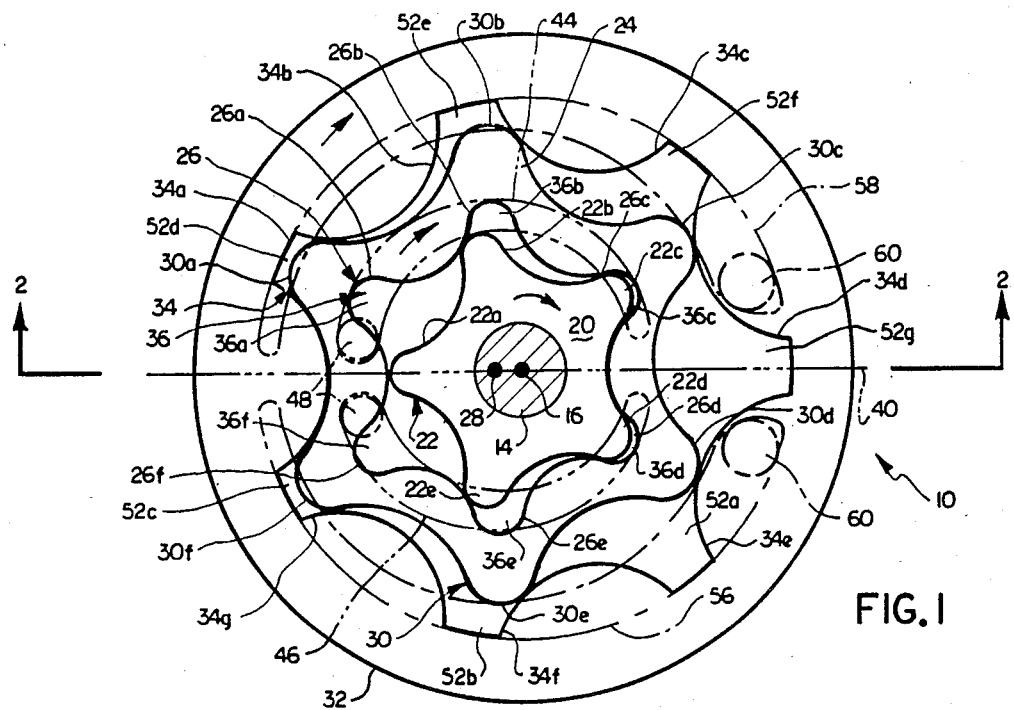
FIG. 1 is a front elevational view of a pump made in accordance with the present invention with some parts removed for clarity.
Figure 2:
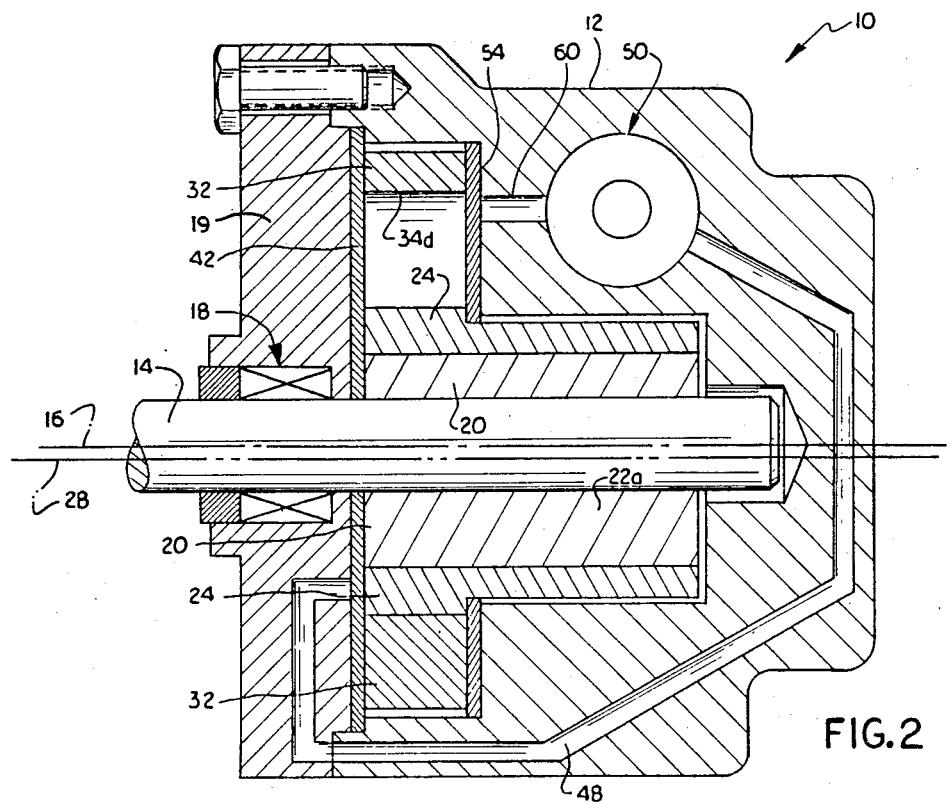
FIG. 2 is a sectional view taken along section line 2—2 of FIG. 1.
Figure 4:
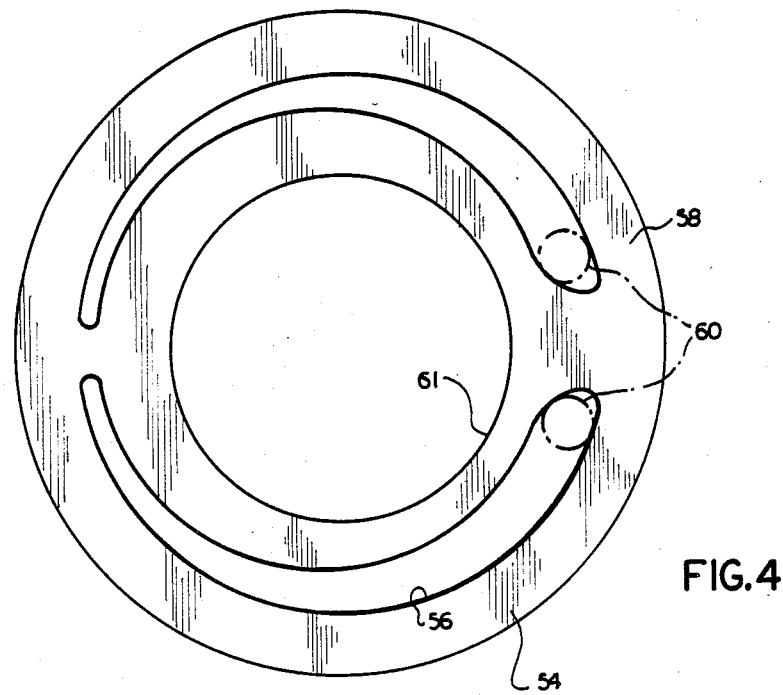
FIG. 4 is a front elevational view of an outer porting plate for the intermediate and outer rotary members.
Figure 3:
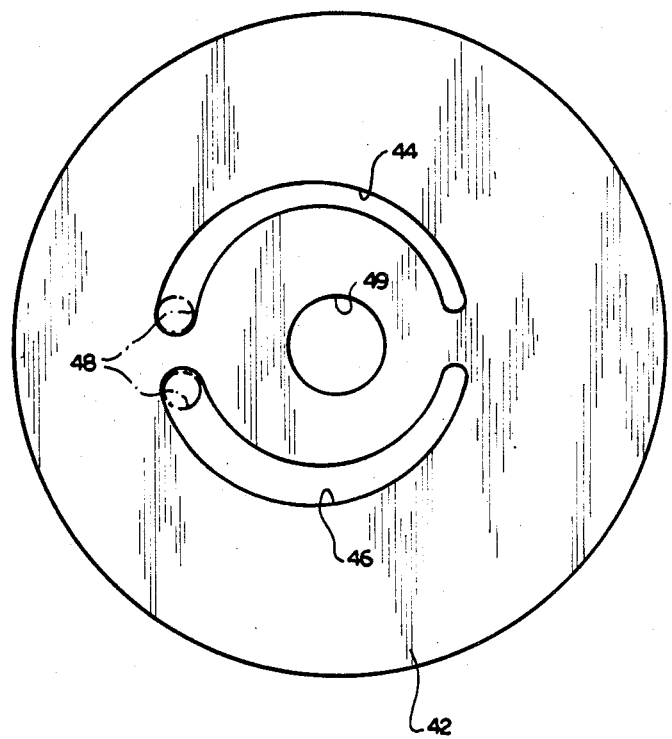
FIG. 3 is a front elevational view of an inner porting plate for the inner and intermediate rotary members.

Referring now to FIGS. 1-4, a double-staged rotary pump 10 includes a housing 12. A drive shaft 14 extends into the housing and is mounted for rotation about an axis 16 relative to the housing 12 by a suitable seal and bearing arrangement 18 in an end cap 19 secured to the housing 12. An inner rotary member 20 is fixed to a drive shaft 14 and is rotatable therewith about the drive shaft axis 16. The inner rotary member 20 has a plurality of circumferentially spaced, radially projecting teeth 22. In the preferred embodiment, the inner member 20 has five radially projecting teeth designated 22a-22e.

An intermediate rotary member 24 encircles the inner rotary member 20. The intermediate rotary member 24 has a plurality of circumferentially spaced internal teeth 26. The number of internal teeth 26 of the intermediate rotary member 24 is preferably at least one more than the number of radially projecting teeth 22 of the inner member 20. In the preferred embodiment, the intermediate rotary member 24 has six internal teeth designated 26a-26f. It will be appreciated that some of the radially projecting teeth 22 of the inner rotary member 20 drivingly engage some of the internal teeth 26 the intermediate rotary member 24. The intermediate rotary member 24 is mounted for rotation about an axis 28 eccentrically disposed from the drive shaft axis 16.

The drive shaft 14 rotates about its axis 16 preferably in a clockwise direction as viewed from FIG. 1. The inner rotary member 20 will also rotate about axis 16 in a clockwise direction since it is fixed to the drive shaft 14. The driving engagement between the inner rotary member 20 and the intermediate rotary member 24 will cause the intermediate rotary member 24 to also rotate in a clockwise direction about the eccentrically disposed axis 28. Since the intermediate rotary member 24 has one more internal tooth 26 than the number of radially projecting teeth 22 of the inner rotary member 20, relative rotation will occur between the inner rotary member 20 and the intermediate rotary member 24. Since the intermediate rotary member has five projecting external teeth and the intermediate rotary member has six internal teeth, a complete revolution of the inner rotary member 20 will cause the intermediate rotary member to rotate 5/6 of a rotation. If the inner rotary member has n number of radially projecting teeth and the intermediate rotary member has n+1 internal teeth, the intermediate rotary member will rotate n/(n+1) of a revolution for each complete revolution of the inner rotary member 20. Also, if the inner rotary member is rotating at a speed r, the intermediate rotary member will be rotating at a speed nr/(n+1).

The intermediate rotary member 24 has a plurality of circumferentially spaced, radially projecting external teeth 30. In the preferred embodiment, the number of circumferentially spaced, radially projecting external teeth 30 of the intermediate member 24 is equal to the circumferentially spaced internal teeth 26 of the intermediate member 24. In the preferred embodiment, six radially projecting external teeth of the intermediate member 24, are designated 30a-30f.

An outer rotary member 32 encircles the intermediate rotary member 24 and is mounted for rotation coincident with the drive shaft axis 16. The outer rotary member 32 has a plurality of circumferentially spaced, internal teeth 34. In the preferred embodiment, the number of internal teeth 34 is equal to one more than the number of radially projecting external teeth 30 of the intermediate member 24. The seven internal teeth of the outer rotary member 32, in the preferred embodiment, are designated 34a-34g.

The number of radially projecting external teeth of the intermediate rotary member 24 can equal a number m and the number of circumferentially spaced, internal teeth of the outer rotary member 32 would equal at least m+1. Some of the radially projecting external teeth 30 of the intermediate rotary member 24 drivingly engage some of the internal teeth 34 of the outer rotary member 32 and rotate the outer rotary member 32. Since rotation of the intermediate rotary member is clockwise, the outer rotary member will rotate clockwise about the drive shaft axis 16. Since, in the preferred embodiment, the intermediate rotary member has six radially projecting external teeth 30 and the outer rotary member 32 has seven circumferentially spaced internal teeth 34, the intermediate rotary member 24 will rotate with respect to the outer rotary member 32. For each complete rotation of the intermediate rotary member 24, the outer rotary member 32 will rotate 6/7 of a complete rotation.

If the intermediate rotary member 24 has m projecting external teeth and the outer rotary member 32 has m+1 internal teeth, the outer rotary member will rotate m/(m+1) of a revolution for each complete revolution of the intermediate rotary member 24. If $m=n+1$, as it does in the preferred embodiment, then the outer rotary member will rotate $(n+1)/(n+2)$ of a revolution with respect to a complete revolution of the intermediate rotary member 24 and $m/(m+2)$ of a revolution with respect to a complete revolution of the inner rotary member 20. Also, if the rotational speed of the inner rotary member is r, the rotational speed of the outer rotary member will be equal to $nr/(n+2)$. In the embodiment shown, the outer rotary member will rotate 5/7 of a revolution for each complete revolution of the inner rotary member 20.

The external teeth 22 of the inner rotary member 20 and the internal teeth 26 of the intermediate rotary member 24 define a first set 36 of successive expanding pumping chambers and contracting pumping chambers. A dividing line 40 designates the division between the expanding pumping chambers and the contracting pumping chambers. As shown in FIG. 1, the pumping chambers 36a, 36b and 36c above the dividing line 40 are successive contracting pumping chambers and the pumping chambers 36d, 36e and 36f below the dividing line 40 are successive expanding pumping chambers.

The pumping chambers continuously rotate in a clockwise direction, and the area or volume of a pumping chamber is continuously changing. Also, the teeth of the rotary members that define any particular pumping chamber will change as the three members rotate. When a majority of a pumping chamber area 36 at a given instant in time is above the line 40, it is contracting or decreasing in volume. When a majority of a pumping chamber area 36 at a given instant in time is below the line 40, it is expanding in volume. There comes a point in the rotation of the pumping chambers when the area of a pumping chamber crossing the dividing line 40 has an equal amount of volume lying on both sides of the line 40. At this particular instant, the chamber is neither contracting or expanding, but is switching from an expanding to a contracting chamber or from a contracting to an expanding chamber. Therefore, to determine if a particular chamber is expanding or contracting at any instant in time, it is necessary to determine if the majority of its volume is above or below the dividing line 40.

A first porting plate 42 is disposed adjacent the sides of the inner rotary member 20, the intermediate rotary member 24 and the outer rotary member 32 and is in sealing contact therewith. The porting plate 42 has a kidney-shaped discharge port 44 that overlies a first set of successive contracting pumping chambers 36a, 36b and 36c above the line 40. The porting plate 42 has a kidney-shaped input port 46 positioned to overlie the first set of successive expanding pumping chambers 36d, 36e and 36f. Separate conduits 48 connect the discharge port 44 and the input port 46 to a fluid flow control device 50. Opening 49 is adapted to receive the drive shaft 14.

The teeth of the intermediate rotary member 24 and the outer rotary member 32 define a second set of successive contracting pumping chambers 52a, 52b and 52c, and a second set of successive expanding pumping chambers designated 52d, 52e and 52f. As the rotary members rotate, the teeth that define any particular pumping chamber will change with time. It will be appreciated that the dividing line 40 divides the second set of successive contracting pumping chambers from the second set of successive expanding pumping chambers opposite from the division of pumping chambers between the inner rotary member and the intermediate rotary member. The second set of successive contracting pumping chambers 52a, 52b and 52c being below the dividing line 40 of FIG. 1 and the second set of successive expanding pumping chambers 52d, 52e and 52f being above the dividing line 40 of FIG. 1. As seen in FIG. 1, a pumping chamber 52g has its volume equally divided above and below the dividing line 40. At this particular instant, the chamber 52g is neither contracting nor expanding. As the pumping chamber continues to rotate counterclockwise and a majority of its volume is below the dividing line 40, the pumping chamber switches from being previously expanding to a contracting pumping chamber.

A second porting plate 54 is in sealing contact with the sides of the inner rotary member 20, intermediate rotary member 24 and the outer rotary member 32. The porting plate 54 has a kidney-shaped discharge port 56 positioned to overlie the second set of successive contracting pumping chambers 52a, 52b and 52c. The porting plate 54 also has a kidney-shaped input port 58 positioned to overlie the second set of successive expanding pumping chambers 52d, 52e and 52f. Separate conduits 60 connect the discharge port 56 and the input port 58 to the fluid flow control device 50. Opening 61 is adapted to receive a back portion of the intermediate rotary member 24.

Figures 5A, 5B:
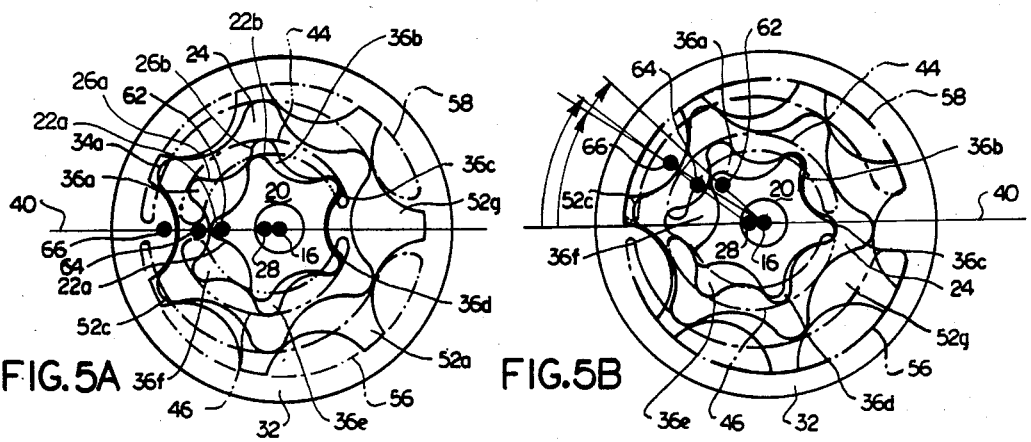

Referring to FIGS. 5A–5I and 6, the operation of the double-staged, rotary pump 10 will be appreciated. Initial relative rotary positions of the inner rotary member 20, the intermediate rotary member 24 and the outer rotary member 32 are shown in FIG. 1. A reference indicator 62 is shown on the inner rotary member 20, a reference indicator 64 is shown on the intermediate rotary member 24 and a reference indicator 66 is shown on the outer rotary member 32. The purpose of the reference indicators 62, 64 and 66 are to show the relative positions of the inner rotary member 20, intermediate rotary member 24 and the outer rotary member 32, respectively, as they rotate. In FIG. 5A, the dividing line 40 is utilized as the initial rotational angle 0° for the inner rotary member 20, the intermediate rotary member 24 and the outer rotary member 32. As stated above, the inner rotary member 20 and the outer rotary member 32 rotate about the drive shaft axis 16. The intermediate rotary member 24 rotates about the axis 28 eccentrically disposed from the drive shaft axis 16. The angles of rotation of the inner rotary member 20 and the outer rotary member 32 are taken from the dividing line 40 and are with respect to a vertex defined by their axis of rotation 16. The angles of rotation of the intermediate rotary member are taken from the dividing line 40 and rotated at an angle with respect to a vertex defined by its axis of rotation 28.

FIG. 5B shows the inner rotary member rotated through an angle of 45°. The intermediate rotary member will be rotated 5/6 of this angle or 37.5° about its axis of rotation 28. The outer rotary member will be rotated 5/7 of 45° about the drive shaft axis 16 or through an angle of 32.1°. It will be appreciated that the chamber 36f in FIG. 5A is an expanding pumping chamber, while in FIG. 5B it becomes a contracting pumping chamber. While the chamber 36c which was the contracting chamber in FIG. 5A is now an expanding pumping chamber in FIG. 5B. It will be appreciated that the expanding pumping chambers between the inner rotary member 20 and the intermediate rotary member 24 remain below the dividing line 40 while the contracting pumping chambers remain above the dividing line 40. The discharge port 44 and the input port 46 remain in an overlying position with the contracting pumping chambers and the expanding pumping chambers, respectively.

The pumping chamber 52g which was a neutral pumping chamber in FIG. 5A becomes a contracting pumping chamber in FIG. 5B. The pumping chamber 52c which was a contracting pumping chamber in FIG. 5A becomes an expanding pumping chamber in FIG. 5B. Again, it will be appreciated that the contracting pumping chambers between the intermediate rotary member 24 and the outer rotary member 32 remain below the dividing line 40, while the expanding pumping chambers between the intermediate rotary member 24 and the outer rotary member 32 remain above the dividing line 40. It will also be appreciated that the discharge port 56 continues to overlie the discharge pumping chambers between the intermediate rotary member 24 and the outer rotary member 32 and the input port 58 continues to overlie the expanding pumping chambers between the intermediate rotary member 24 and the outer rotary member 32.

The kidney-shaped ports 44, 46, 56 and 58 are adapted to be in communication with associated pumping chambers that are contracting or expanding. When a pumping chamber has an equal volume on both sides of the dividing line 40 so as to be in neither an expanding nor contracting mode, such pumping chamber will not be in communication with any port. In FIG. 5A, it will be appreciated that pumping chamber 52g is not in communication with either port 56, 58. As soon as a majority of the volume of pumping chamber 52g crosses below the dividing line 40, it will be in communication with discharge port 56.

Figures 5C, 5D:
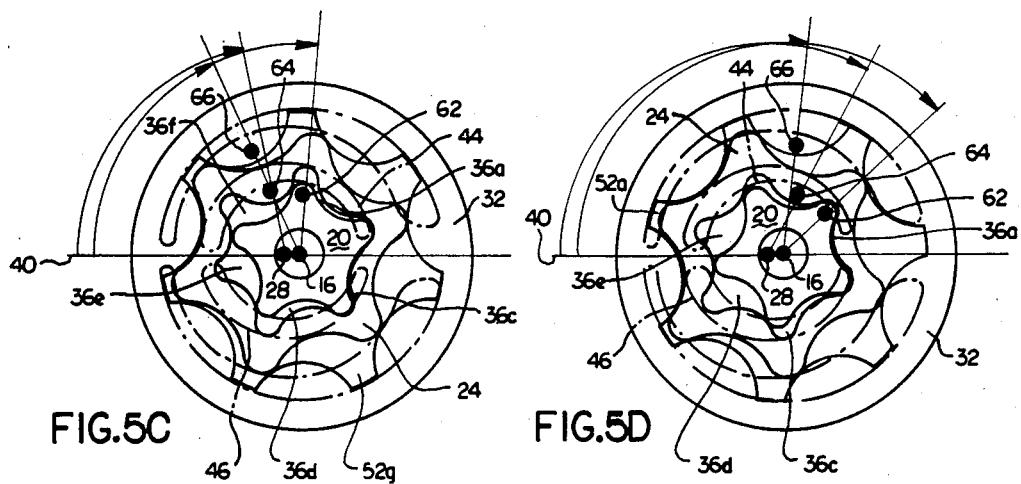

FIG. 5C shows the inner rotary member rotated through an angle of 90° which rotates the intermediate rotary member through an angle of 75° and the outer rotary member through an angle 64.3°. FIG. 5D shows the inner rotary member rotated through an angle of 135°, the intermediate rotary member rotated through an angle of 112.5° and the outer rotary member rotated through an angle of 96.4°. It will be appreciated that the pumping chamber 36e in FIGS. 5A, 5B, and 5C was an expanding pumping chamber with a majority of its volume positioned below the dividing line 40 and is a contracting pumping chamber in FIG. 5D as a majority of its volume crosses above the dividing line 40. Also, the pumping chamber 36e was in communication with the input port 46 in FIGS. 5A, 5B and 5C while it was an expanding pumping chamber and is in communication with the discharge port 44 when it becomes a discharge pumping chamber in FIG. 5D.

FIG. 5E shows an inner rotary member 20 rotated through an angle of 180°, the intermediate rotary member rotated through an angle of 150° and the outer rotary member rotated through an angle of 128.6°. Pumping chamber 36a, which was contracting in FIGS. 5A, 5B, 5C and 5D, is beginning to expand in FIG. 5E. Pumping chamber 36d was an expanding pumping chamber in FIGS. 5A, 5B, 5C and 5D is in a neutral position in FIG. 5E with equal volume on both sides of the dividing line 40. In such neutral position, the pumping chamber 36d is not in communication with either port 44, 46. Pocket 36e continues to contract in FIG. 5E. In FIG. 5F, the inner rotary member is rotated through an angle of 225°, which rotates the intermediate rotary member through an angle of 187.5° and the outer rotary member through an angle of 160.7°. The chamber 36d begins to contract as the majority of the chamber crosses the dividing line 40. FIG. 5G shows the inner rotary member rotated through an angle of 270° which rotates the intermediate rotary member through an angle of 225° and the outer rotary member through an angle of 192.9°.

Again, it will be appreciated that during relative rotation of the three rotary members, the expanding pumping chambers between the inner rotary member 20 and the intermediate rotary member 24 remain in communication with the input port 46 and the contracting pumping chambers between the inner member 20 and the intermediate member 24 remain in contact with the discharge port 44. Similarly, the expanding pumping chambers between the intermediate rotary member 24 and the outer rotary member 32 remain in communication with the input port 58 and the contracting pumping chambers between the intermediate member 24 and the outer rotary member 32 remain in communication with the discharge port 56.

FIG. 5H shows the inner rotary member rotated through an angle of 315°, which rotates the intermediate rotary member through an angle of 262.5° and rotates the outer rotary member through an angle of 225°. FIG. 5I shows the inner rotary member rotated one complete revolution through an angle of 360°, which rotates the intermediate rotary member through angle of 300° and the outer rotary member through an angle of 257.1°. It will be appreciated that the inner rotary member has rotated one complete revolution, the intermediate rotary member has rotated 5/6th of a complete revolution and the outer rotary member has rotated 5/7th of a complete revolution. These correlations are also the same when comparing the relative rotational speed between the various elements. If the inner rotary member rotates at a rotational speed equal to r, the intermediate rotary member will rotate at a speed equal to $(5/6)r$ and the outer rotary member will be rotating at an angular speed equal to $(5/7)r$.

Referring to FIGS. 5A and 5I, it will be seen that the teeth of the inner rotary member and the intermediate rotary member that define chamber 36a is different in FIG. 5A than in FIG. 5I. In FIG. 5A, chamber 36a is defined by teeth 22a, 22b and 26a. In FIG. 5I, chamber 36a is defined by teeth 22a, 22b and 26b.

It will be appreciated by studying the FIGS. 5A-5I and the chart of FIG. 6 that the set of successive contracting pumping chambers between the inner rotary member 20 and the intermediate rotary member 24 remains in communication with the discharge port 44 and the set of successive expanding pumping chambers between the inner rotary member 20 and the intermediate rotary member 24 remain in communication with the input port 46. Also, the set of successive contracting pumping chambers between the intermediate rotary member 24 and the outer rotary member 32 remain in communication with the discharge port 56 and the set of successive expanding pumping chambers between the intermediate rotary member 24 and the outer rotary member 32 remains in communication with the input port 58.

From the above, it should be apparent that the first set of successive contracting pumping chambers and the first set of successive expanding pumping chambers in combination with the associated porting plate 42 define a first pump or first pump stage 68 having an output port 44 and an input port 46. The second set of successive contracting pumping chambers and the second set of successive expanding pumping chambers in combination with the associated porting plate 52 define a second pump or second pump stage 70 having an input port 58 and an output port 56.

Figure 7:
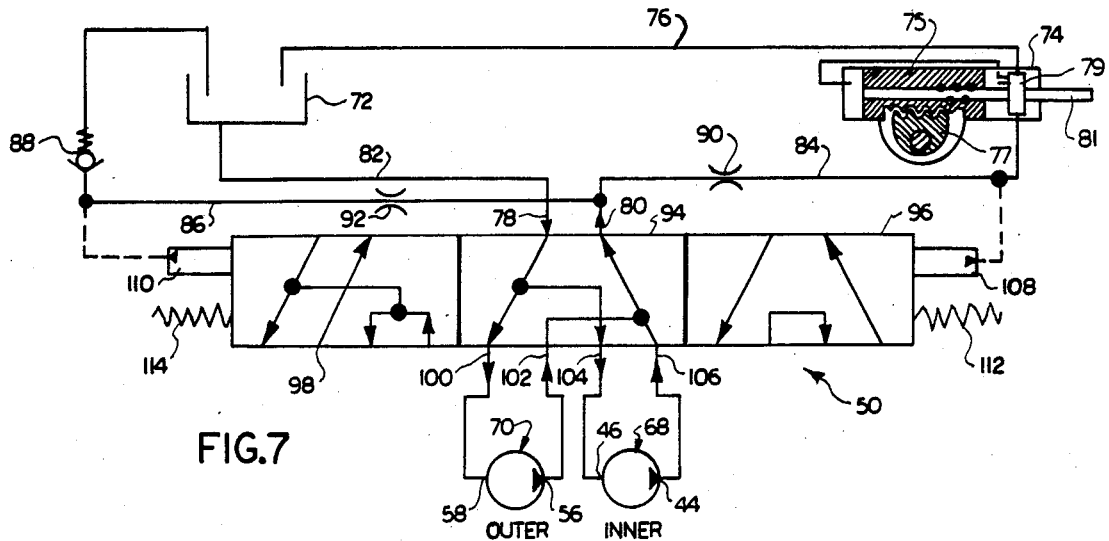
FIG. 7 is a schematic illustration of a fluid flow control means in accordance with the present invention.

The pumps 68, 70 may be used in a variety of hydraulic systems. Specifically, the pumps may be used in a power steering system for a vehicle as shown in FIG. 7. A control valve means 50 (FIG. 7) is associated with the pumps 68, 70 and controls flow from a reservoir to the pumps 68, 70 and from the pumps 68, 70 to the steering motor.

Specifically, as shown in FIG. 7, reservoir 72 provides a supply of hydraulic fluid. An open center hydraulic steering unit 74, such as shown in U.S. Pat. No. 4,206,827, which is fully incorporated herein by reference, is associated with the pumps 68, 70. The steering unit 74 includes an open center valve and a power steering assist mechanism controlled by the valve as are known. The open center valve of the steering unit 74 is connected to the reservoir 72 by a return line 76.

The steering unit 74 includes a piston 75 having linear rack teeth in meshing engagement with teeth on a gear segment 77. An open-center valve 79 (shown schematically) is coupled to the steering shaft 81. When no steering maneuver is being made, the valve provides flow through communication between its input port and its output port. During a steering maneuver, rotation of the shaft 81 will actuate the valve to pinch off the flow and direct pressurized fluid to one side of the piston 75, the side being dependent on the direction of the steering maneuver which is a function of the direction of rotation of shaft 81.

The flow control valve means 50 has a main input port 78 and a main output port 80. The main input port 78 is connected to the reservoir 72 through a connecting line 82. The main output port 80 is connected to the input port of the hydraulic device 74 through a connecting line 84. A pressure relief line 86 is connected to the main output port 80 and to a check valve 88. The output side of the check valve 88 is connected to the reservoir 72. If the pressure in the line 86 exceeds a predetermined amount sufficient to open the normally closed check valve 88, the pressure will be released through the relief line 86 back to the reservoir 72. An orifice 90 is provided in the connecting line 84 and an orifice 92 is provided in the pressure relief line 86.

The flow control valve means 50 has three valve envelopes designated in FIG. 7, as 94, 96 and 98. The flow control valve means 50 also includes a first pump connecting inlet port 100, a first pump connecting outlet port 102, a second pump connecting inlet port 104 and a second pump connecting outlet port 106. The first pump connecting inlet port 100 is connected to the inlet port 58 of the pump 70. The output port 56 of the pump 70 is connected to the first pump connecting outlet port 102. The second pump connecting inlet port 104 is connected to the inlet 46 of the pump 68. The output 44 of the pump 68 is connected to the second pump connecting outlet port 106.

Each valve envelope 94, 96 and 98 has different valve elements to connect the pumps 68, 70 in differing modes. The valve envelope 94 when operatively positioned, connects the pumps 68, 70 in parallel by internal valve elements connecting the main inlet port 78 to both the first pump connecting inlet port 100 and the second pump connecting inlet port 104. The valve elements of valve envelope 94 also connect both the first pump connecting outlet port 102 and the second pump connecting outlet port 106 to the main output port 80.

The valve envelope 96, when operatively positioned, connects the pumps 68, 70 in series. This is accomplished by the valve elements connecting the main input port 78 to the first pump connecting inlet port 100. The first pump connecting outlet port 102 is connected to the second pump connecting inlet port 104. The second pump connecting outlet port 106 is connected to the main output port 80. Thus, the amount of pressure at the main output port 80 is the sum of the pressures produced by the pumps 68, 70.

The valve envelope 98, when operatively positioned, connects the pumps 68, 70 in a flow through, recirculating mode. This is accomplished by the valve element connecting the main input port 78 to the first pump connecting inlet port 100 and connecting the first pump connecting outlet port 102 to the main output port 80. The second pump connecting inlet port 104 is connected to the second pump connecting outlet port 106 for recirculating fluid through the pump 68. Therefore, the pressure at the main output port 80 will be the pressure generated by the pump 70. A connection 107 is made between the recirculating fluid path and the connection between the main input port 78 and the first pump connecting inlet port 100 to compensate for any internal pressure differentials that could occur within the pump 68.

Fluid responsive pilot controls 108, 110 are provided to control the switching of the fluid flow control device 50 to position a selected one of the valve envelopes 94, 96 and 98 in communication with the pumps 68, 70. Springs 112, 114 are provided on each side of the fluid flow control device 50. The pilot 108 is operatively coupled to the connecting line 84 between orifice 90 and the hydraulic device 74 and the pilot 110 is operatively coupled to the pressure relief line 86 between the orifice 92 and the check valve 88. The fluid flow control device 50 switches in response to the pressure differential across orifices 90, 92 in the lines 84, 86, respectively, as sensed by pilot controls 108, 110.

The flow control device 50 is biased by springs 112, 114 into the position shown in FIG. 7 where envelope 94 is located in communication with the pumps 68, 70. In such condition, the pumps 68, 70 are connected in parallel through the valve envelope 94. The pressure differential across orifices 90, 92, as sensed by pilots 110, 108, is not sufficient to move the valve 50 against the bias force of either spring 114 or 112. This position of the valve will be maintained as long as the pressure differential across orifices 90, 94 and in pilots 110, 108 is insufficient to overcome the bias force of springs 112 or 114. This will occur over a range of relatively low engine speeds and during certain steering maneuvers. A predetermined amount of pressure differential must be present between pilots 108, 110 to overcome the spring bias.

As engine speed increases fluid flow through orifice 90 increases and the pressure drop across orifice 90 increases. When engine speed reaches a predetermined level, the pressure drop across orifice 90 will be such that the pressure differential in pilots 108, 110 will increase, and the pressure in the pilot 110 will overcome the bias force of the spring 112 resulting in a shifting of the valve 50 to the right to communicate envelope 98 with the pumps 68, 70. Thus, the pressure at the main output 80 will be equal to the pressure generated only by the pump 70. Thus, steering maneuvers will be conducted at a lower pressure than when the pumps 68 and 70 are connected in parallel.

Steering maneuvers, such as dry surface parking, require maximum output pressure. When the open-center valve 79 in steering unit 74 is moved toward a closed condition during a substantial steering maneuver, pressure in line 84 increases substantially. This increase is communicated to check valve 88 through line 86. When the pressure increases sufficiently, check valve 88 will open. When this occurs, the pressure in pilot 110 will reduce and the pressure differential across orifices 90, 92 and pilots 108, 110 will be sufficient to cause pilot 108 to overcome the bias force of spring 114. This results in the control valve means 50 shifting to the left, placing envelope 96 in communication with the pumps 68, 70. In this mode, the output pressure at the main output port 80 will be the sum of the pressures across each pump 68, 70 since the pumps are in series, and maximum pressure is delivered to the steering assist motor.

This invention has been described with reference to a preferred embodiment. Modifications and alterations may occur to others upon reading and understanding this specification. It is my intention to include all such modifications and alterations insofar as they come within the scope of the appended claims or the equivalent thereof.

What is claimed is:

1. Apparatus comprising:
   a rotatable drive shaft;
   an inner rotary member fixed to said rotatable drive shaft, said inner rotary member having n number of circumferentially spaced, radially projecting teeth;
   an intermediate rotary member encircling said inner rotary member and having at least n+1 circumferentially spaced, internal teeth some of which are in meshing cooperation with said teeth of said inner rotary member;
   said radially projecting teeth of said inner rotary member and said internal teeth of said intermediate member defining a first set of successive expanding pumping chambers and a first set of successive contracting pumping chambers;
   said intermediate member having m number of circumferentially spaced radially projecting external teeth;
   an outer member encircling said intermediate member and mounted for rotation about an axis coninicident with the axis of said drive shaft;
   said outer rotary member having at least m+1 circumferentially spaced internal teeth some of which are in meshing cooperation with said radially projecting external teeth of said intermediate rotary member;
   said radially projecting external teeth of said intermediate rotary member and said internal teeth of said outer rotary member defining a second set of successive expanding pumping chambers and a second set of successive contracting pumping chambers;
   each radially projecting tooth of said inner rotary member having a portion in bearing surface contact with said intermediate member and each internal tooth of said outer member having a portion in bearing surface contact with said intermediate member so as to support said intermediate member for rotation about an axis eccentrically disposed relative to the axis of said drive shaft.

2. The apparatus of claim 1 wherein the number m of circumferentially spaced radially projecting external teeth of said intermediate member is equal to n+1 and the number m+1 of circumferentially spaced internal teeth of said outer rotary member is equal to n+2.

3. The apparatus of claim 1 further comprising porting means for directing fluid flow to each chamber of said first set of successive expanding pumping chambers and to each chamber of said second set of successive expanding pumping chambers and directing fluid flow from each chamber of said first set of successive contracting pumping chambers and from each chamber of said second set of successive contracting pumping chambers.

4. The apparatus of claim 3 further including a housing having a recessed portion for receiving said rotary members and said porting means and further including an end cap sealingly attached to said housing and receiving said rotatable drive shaft and retaining said rotary members and said porting means axially fixed in said housing.

5. The apparatus of claim 3 further comprising:
   a fluid reservoir;
   a hydraulic unit; and
   a fluid flow control means having a main input port in communication with said fluid reservoir and a main output port in communication with said hydraulic unit, and being in communication with said porting means for coupling said first set of successive expanding pumping chambers, said first set of successive contracting pumping chambers, said second set of successive expanding pumping chambers and said second set of successive contracting pumping chambers in differing modes of communication to effect in one mode, communication of said main input port with said second set of expanding pumping chambers, communication of said second set of contracting pumping chambers with said first set of expanding pumping chambers and communication of said first set of contracting pumping chambers with said main output port, to effect in a second mode, communication of said main input port with said second set of expanding pumping chambers, communication of said second set of contracting pumping chambers with said main output port and communication of said first set of expanding pumping chambers with said first set of contracting pumping chambers, and to effect in a third mode, communication of said main input port with said first and second set of expanding pumping chambers and communication of said main output port with said first and second set of contracting pumping chambers.

6. The apparatus of claim 5 further including switching means for selectably switching said fluid flow control means to any of said differing modes of communication.

7. The apparatus of claim 6 further including a check valve connected to said output port and to said reservoir, said check valve returning fluid to said fluid reservoir when fluid pressure acting on said check valve exceeds a predetermined value.

8. The apparatus of claim 7 further including a first orifice disposed between said main output port and said check valve and a second orifice disposed between said hydraulic unit and said main output port.

9. The apparatus of claim 8 wherein said switching means includes a first pilot control coupled to the check valve side of said first orifice and a second pilot control coupled to the hydraulic unit side of said second orifice, said first and second pilot controls acting on opposite sides of said flow control means responsive to fluid pressure on said first and second pilot controls.

10. Apparatus comprising:
a rotatable drive shaft having an axis of rotation;
an inner rotary member fixed to said rotatable drive shaft for rotation about an axis conincident with said axis of rotation of said drive shaft and having n number of circumferentially spaced, radially projecting teeth;
an intermediate rotary member encircling said inner rotary member and having n+1 number of circumferentially spaced, internal teeth some of which are drivingly engaged by said radially projecting teeth of said inner rotary member, said intermediate rotary member being rotatable about an axis eccentrically disposed from the axis of rotation of said drive shaft, said inner rotary member being rotatable with respect to said intermediate rotary member;
said radially projecting teeth of said inner rotary member and said internal teeth of said intermediate rotary member defining a first set of successive expanding pumping chambers and a first set of successive contracting pumping chambers;
said intermediate rotary member having m number of circumferentially spaced, radially projecting external teeth; and
an outer rotary member encircling said intermediate rotary member and having m+1 number of circumferentially spaced, internal teeth some of which are drivingly engaged by said radially projecting teeth of said intermediate rotary member, said outer rotary member being rotatable about an axis coincident with the axis of rotation of said drive shaft, said intermediate rotary member being rotatable with respect to said outer rotary member;
said external teeth of said intermediate rotary member and said internal teeth of said outer rotary member defining a second set of successive expanding pumping chambers and a second set of successive contracting pumping chambers;
said intermediate rotary member remaining in bearing surface contact with both said inner rotary member and said outer rotary member and supported thereby for rotary motion about said eccentric axis.

11. The apparatus of claim 10 further including porting means for directing fluid flow to said first set of successive expanding pumping chambers and from said first set of successive contracting pumping chambers and for directing fluid flow to said second set of successive expanding pumping chambers and from said second set of successive contracting pumping chambers, said bearing surface contact between said intermediate rotary member and both said inner rotary member and said outer rotary member providing a seal between said first successive expanding pumping chambers and said first set of successive contracting pumping chambers and between said second set of expanding pumping chambers and said second set of successive contracting pumping chambers.

12. The apparatus of claim 11 wherein the combination of said first set of successive expanding pumping chambers and said first set of contracting pumping chambers define a first pump and the combination of said second set of successive expanding pumping chambers and said second set of successive contracting pumping chambers define a second pump, said apparatus further including:
flow control means operatively connected to said porting means for selectively combining said first and said second pumps in differing modes of communication to effect in one mode, series communication of said pumps, in a second mode, parallel communication of said pumps and for selectively, in a third mode, connecting the expanding pumping chambers to the contracting pumping chambers of one of said pumps.

13. Apparatus for controlling fluid flow from a reservoir to a first pump having a first input port and a first output port and a second pump having a second input port and a second output port and for controlling fluid flow from the pumps to a use location, said apparatus comprising:
means defining a main input port communicating with the reservoir;
means defining a main output port communicating with the use location;
series communication means for connecting said first pump in series with said second pump between said main input port and said main output port;
parallel communication means for connecting said first pump in parallel with said second pump between said main input port and said main output port; and
flow-through, recycle communication means for connecting only one of said pumps between said main input port and said main output port and for connecting the output port of the other of said pumps to its own input port to recirculate said fluid therethrough.

14. The apparatus of claim 13 further including switching means for selectably switching said first pump and said second pump to said series communication means, said parallel communication means and said flow-through, recycle communication means.

15. The apparatus of claim 14 wherein said switching means includes pilot controls acting on said apparatus responsive to fluid pressure on said pilot controls.

16. Apparatus for controlling fluid flow from a reservoir to a first pump and a second pump and for controlling fluid flow from the first and second pumps to a use location, said apparatus comprising:
a main inlet port communicating with said reservoir;
a main outlet port communicating with said use location;
a first pair of pump connecting ports including a first pump connecting inlet port connected to an inlet of said first pump and a first pump connecting outlet port connected to an outlet of said first pump;
a second pair of pump connecting ports including a second pump connecting inlet port connected to an inlet of said second pump and a second pump connecting outlet port connected to an outlet of said second pump; and
a valve movable between three positions, said valve in one position having means connecting said main inlet port with said second pump connecting inlet port, connecting said second pump connecting outlet port with said first pump connecting inlet port and connecting first pump connecting outlet port with said main outlet port, said valve in a second position having means connecting said main inlet port with said second pump connecting inlet port, connecting said second pump connecting outlet port to said main outlet port, and connecting said first pump connecting inlet port with said first pump connecting outlet port, and said valve in a third position having means connecting said main inlet port with said first and second pump connecting inlet ports and connecting said main outlet port with said first and second pump connecting outlet ports.

17. The apparatus of claim 16 further including:
positioning means operatively coupled to said valve for positioning said valve to any of said three positions.

18. The apparatus of claim 17 wherein said positioning means includes pilot control means acting on opposite sides of said valve.

* * * * *